United States Patent [19]
Killian et al.

[11] Patent Number: 5,233,149
[45] Date of Patent: Aug. 3, 1993

[54] REPROCESSING WELD AND METHOD

[75] Inventors: Michael L. Killian, Troy; Harry E. Lewis, Mt. Clemens, both of Mich.

[73] Assignee: Eaton Corporation, Cleveland, Ohio

[21] Appl. No.: 739,699

[22] Filed: Aug. 2, 1991

[51] Int. Cl.[5] .............................................. B23K 9/00
[52] U.S. Cl. ............................ 219/76.12; 219/137 R
[58] Field of Search ............... 219/137 R, 76.1, 76.12, 219/76.14, 74

[56] References Cited

U.S. PATENT DOCUMENTS

| | | |
|---|---|---|
| 1,554,546 | 9/1925 | Austin . |
| 1,688,360 | 10/1928 | Steigerwald . |
| 3,001,059 | 9/1961 | Jones . |
| 3,185,814 | 5/1965 | Rössner et al. . |
| 4,049,186 | 9/1977 | Hanneman et al. . |
| 4,107,505 | 8/1978 | Eftefield . |
| 4,782,206 | 11/1988 | Ayres et al. . |

FOREIGN PATENT DOCUMENTS

| | | |
|---|---|---|
| 59-50969 | 3/1984 | Japan . |
| 60-152371 | 8/1985 | Japan . |
| 62-24867 | 2/1987 | Japan . |
| 1433678 | 10/1988 | U.S.S.R. ................................ 219/74 |

Primary Examiner—Clifford C. Shaw
Attorney, Agent, or Firm—Watts, Hoffmann, Fisher & Heinke Co.

[57] ABSTRACT

A fatigue-resistant welded joint between structural members and process for making same, as for an automotive bracket, are shown. A filler metal-containing reprocessing weld is applied over at least part of a toe of a small primary structural weld at the joint, the reprocessing weld extending onto the weld face area and onto the structural member area immediately adjacent to the covered toe portion. The total welding energy input used for the reprocessing weld is less than the welding energy input used for making said primary structural weld, and the cross-sectional area of the reprocessing weld is less than the corresponding cross-sectional area of the primary structural weld.

21 Claims, 2 Drawing Sheets

REPROCESSING WELD AND METHOD

BACKGROUND OF THE INVENTION

1. Field of the Invention

This invention relates to a fatigue-resistant welded joint and to a method for making the same.

2. Description of the Prior Art

Various ways of modifying a primary structural weld, such as a fillet weld, have been used to the improve weld strength, to temper the weld, to reinforce it, or to render it impermeable. Thus, one or more weld metal beads have been superimposed on a structural weld, sometimes to cover it completely and, often, the immediately adjacent portions of at least one of the base metal pieces also. Superimposition of welds is characteristic of multiple pass welding wherein one makes a root pass followed by one or more cover passes, uses a technique such as that of U.S. Pat. No. 1,554,546, uses a Temper Bead Technique (TBT); or welds according to the specification NAVSHIPS 0900-006-9010 Standard for Fabrication Welding, and Inspection of HY-80 Submarine Hulls.

Also, it has been known that the toe of the primary structural weld can be subject to reprocessing with an electric arc without any filler metal, thereby acting to remelt the weld surface and perhaps form a tiny bead therefrom at the toe (as in U.S. Pat. No. 1,688,360 or by so-called Tungsten Inert Gas—i.e., TIG—Dressing). Additionally, covering and bridging passes over primary structural welds have been used for reducing a stress corrosion tendency in nuclear reactor water lines (U.S. Pat. No. 4,049,186).

For the purposes of this application a "toe" of a structural weld is defined by a line where the length of the structural weld metal meets the base metal. Thus, a single pass fillet weld between two angularly abutting pieces of base metal has two toes; so has a single pass seam weld between two pieces of base metal, such seam weld being where two base metal pieces overlap to be joined from the end of one piece to a side of the other; the seam weld is in effect, a form of a fillet weld.

Additionally, various built-up welding bead application methods have been proposed. One is a bead built up spirally from the edge toward the center of a hole in the base metal to bridge over the hole. Another involves fillet weld reprocessing wherein one makes, seemingly for preventing internal defects from occurring in a fairly large fillet weld, e.g., having a leg wider than an inch, a succession of several ever narrower and narrower beads stacked one over the other and up against a piece of the base metal that makes one part of the fillet joint. (Japanese laid-open Sho-59-50969.) Because the welding energy input of such successive weld layers is cumulative, considerable additional welding energy input can be incurred from such stacking practice at the joint. The energy input can be double or more that of the primary structural weld at the base of the stack even though it is reduced with each ascending layer.

The primary structural welds referred to herein are extended (e.g. at least about 2 inches long, often 6 to 10 inches long and even longer). They are comparatively small, i.e. having maximum length of each fusion face about 20 mm., and often less than half that. They are load-carrying structural elements of weld bead-containing filler metal, and they are used to join pieces of weldable metal. They are to be distinguished from overlay welds or a shape melting practice that is used to build up and/or coat a surface rather than to join pieces of preformed metal.

Temper Bead Technique has been used for tempering the heat-affected zones of structural welds. For example, this technique is used for welding heavy pieces such as high strength steel (HY 80 or 100) for nuclear submarines. There the temper bead or beads lie on the top of the structural weld. Contact between the temper beads and the base metal is to be avoided in most cases. However, when such temper beads are used on single pass and two-pass fillet welds, such otherwise undesirable contact can be tolerated Thus, the toe area of the structural weld and its bordering base metal can be covered with a bead from a temper pass.

Conventional welding practice in laying down a temper bead pass or one or more cover pass beads for a multipass operation characteristically is done while the previous pass still is hot, and it is done at about the same power level (welding energy input) as the primary structural weld passes or the other passes previously made. Normally, also, temper bead passes and such heat treatments extend for the full length of the primary structural weld.

Structurally-welded assemblies, such as those used in truck and other automotive applications, can fail from fatigue. Welded brackets, such as hanger brackets on truck axles, often are fatigue-prone. A fatigue-prone area, section or zone of a weldment typically is a site of stress concentration, e.g. a narrowing, or a sharp change in the structural geometry of the assembly. Sometimes it is just some site that repeatedly shows fatigue cracks for another reason. An example of a fatigue-prone automotive bracket is an air chamber bracket used in the braking system of heavy tractor/-trailer rigs. This bracket comprises a steel tube which is normal to and passes through holes in two steel arms; it relies on fillet welds to join the arm and the tube components together and transmit loads. The fillet weld to the arm that has the air cylinder cantilevered from it is representative of a weldment that tends to fail by initiation and propagation of fatigue cracks, typically at a toe on the arm of the fillet weld; such cracks can be followed by substantial fracture.

A small primary structural weld in this application means one which has no fusion face (e.g. a leg of a fillet weld) that is larger than about 20 mm. Typically the welds are about half that size for an air chamber bracket for a heavy-duty truck brake. When reference herein is made to the size of such face or the leg size of a fillet weld, what is meant is a mean average of such face or leg size taken at intervals along the length of the weld.

The usual fillet weld is a weld of approximately triangular cross section joining two surfaces at right angles to each other in a lap joint, T-joint, or corner joint. However, in this application, the intersection of the two surfaces also may form an acute or obtuse angle instead, and the intersection may define a straight or curved line that may be in a single plane or in more than one plane.

Advantages of the present invention over prior proposals include the combination of its being practical for the small primary structural welds as noted above, its economy, its providing the resulting weldments with improved fatigue resistance, and its ease of process control during deposition for obtaining readily a smooth, reasonably uniform overall weld contour with attendant reduction of abrupt shape changes as well as reenforcement of the primary structural weld by the addition of a significant amount of metal to the joint. The invention provides a tempering and a beneficial redistribution of stress in the primary (fillet) structural weld. Significantly, also, there tends to be less joint distortion than if a conventional reprocessing weld were applied in conventional manner over the primary structural root weld, e.g. as a temper bead pass or as a lamination of stacked narrower and narrower beads.

Moreover, use of the invention can act to melt away a weakening notch occurring from a primary structural weld undercut at a toe of the primary structural weld, and to remove slag and nonmetallic inclusions that may be entrapped at a toe of the primary structural weld.

While not intending to be bound by theory as to why the inventive welding method and resulting product are so effective in cutting down on fatigue failures of welded assemblies, it is believed that the combination of stress relieving/tempering at fatiguing portions of the primary structural weld, removing any primary structural weld notch and/or slag or nonmetallic inclusions entrapped at the overlaid part of a toe of the primary structural weld, achieving a smoother (i.e. less abrupt) weld contour there, reenforcing the primary weld, redistributing the stress on the primary weld by assuming some of the stress itself, and low resulting joint distortion from the additional welding energy all contribute to obtaining good resistance of the resulting weld to fatigue cracking.

The specific "welding energy input" used to deposit one or more reprocessing weld beads over a structural weld on a joint root of structural members tends to make the resulting composite weld unique. The magnitude of such input establishes the relative size and scope of the tempering zone and the heataffected zones beneath the composite weld and imparts certain stresses and/or distortions to the resulting weldment; the magnitude of these generally rises with a rise in such input. As the welding energy input of successive welds over a root pass weld is cumulative, the relationship between the magnitude of such input into a root pass weld and the magnitude of the input into the successive reprocessing welds is one practical way to help define one or more reprocessing welds themselves as well as the process of making them. This is because the several concurrent effects that the reprocessing weld can have on the structural weld.

A discovery here which is particularly beneficial is that favorable effects from the welding energy input of a reprocessing weld deposit, such as tempering and strengthening of a welded area, can be effectively preserved to a practical degree without having to encounter and endure appreciable bad effects from the same welding energy input to that reprocessing deposition such as an unsatisfactory degree of weldment distortion or strain. The instant invention involves that discovery.

SUMMARY OF THE INVENTION

One aspect of the invention is a process for improving a process for improving the fatigue resistance of a small primary structural weld at a joint between structural members of a weldment, the weld having been made with the welding energy input of $E_1$, the process comprising:

applying a reprocessing weld on at least a portion of a toe of the structural weld, thereby covering said toe portion, the reprocessing weld containing a filler metal and having a cross-sectional area which is less than the corresponding cross-sectional area of the primary structural weld, the reprocessing weld extending onto the face of the weld at one side of the toe portion covered and onto the metal member at the other side of the toe portion covered, and the total welding energy input, $E_2$, used in said reprocessing of the primary structural weld being less than the welding energy input $E_1$ of the primary structural weld.

Another aspect of this invention is a fatigue-resistant small welded joint comprising:

a pair of structural members joined together by a primary structural weld, said primary structural weld having been deposited with the welding energy input of $E_1$, and a reprocessing weld on at least a portion of a toe of the primary structural weld, thereby covering said toe portion, the reprocessing weld extending onto the face of the primary structural weld at one side of the toe portion covered and onto the structural member at the other side of the toe portion covered, the reprocessing weld containing a filler metal and having a cross-sectional area which is less than the corresponding cross-sectional area of the primary structural weld, and the reprocessing weld having been deposited with the welding energy input of $E_2$, $E_2$ being less than $E_1$.

The welding energy input in this application is measured in terms of kilojoules per inch of the joint that is being covered with weld metal. It will be referred to as "kilojoules per inch" and abbreviated "KJ/In".

The reprocessing weld can be applied to the primary structural weld when the latter still is heated from its just having been applied, or after the primary weld has cooled, e.g. to room temperature (typically 70° F.). Applying the reprocessing when the primary structural weld is in the latter (cooled) condition generally provides the weldment with the greater fatigue resistance than when the fresh structural weld is still very hot, but it is normally the more expensive way to operate. Also, the improvement in fatigue resistance resulting from such hot practice ordinarily is enough to recommend it in many applications.

DESCRIPTION OF PREFERRED EMBODIMENTS

Figure 1:
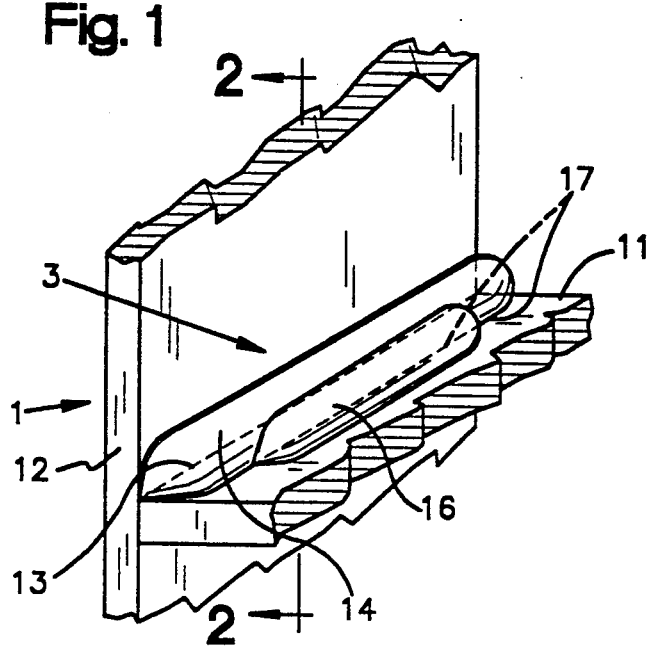
FIG. 1 is a fragmentary, isometric view of a bracket weldment made by fillet welding a horizontal piece of steel to a vertical piece of steel.
Figure 2:
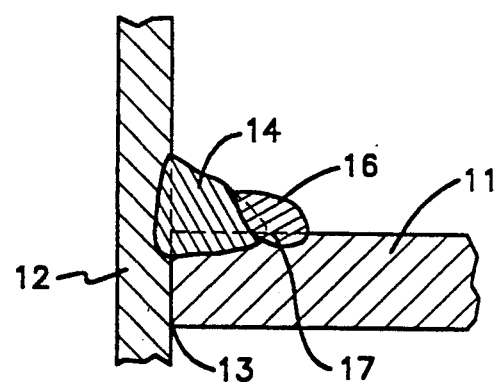
FIG. 2 is the vertical cross-section of FIG. 1 taken through the plane of line 2—2 of FIG. 1 to indicate weld locations.

Referring to the drawings and in particular to FIGS. 1 and 2 thereof, there is illustrated a small fillet-welded bracket assembly, designated generally at 1. The assembly includes a horizontal steel support piece 11 joined, at right angles, to a vertical steel support piece 12. As shown, the pieces 11 and 12 are joined together by a primary structural fillet weld 14 partly overlapped by reprocessing weld 16, the weld 16 being made in accordance with the present invention to provide the composite weld indicated generally by arrow 3. The support piece 11 may, for example, have a thickness of approximately 7/16 inches and the vertical piece 12 may have a thickness of approximately ¼ inch with the support pieces being made from a mild steel material preferably having a grade SAE 10/18. As shown, the resulting composite includes a single pass primary structural fillet weld 14 which may be deposited at the root of the joint between the pieces 11 and 12, and which preferably extends along the full length of the root of the joint between the pieces 11 and 12. For example, the primary structural weld in the example shown may have a length of approximately 7.4 inches with a thickness of approximately ⅜ inch at its actual throat as illustrated in FIG. 2 and having legs that each are about ⅜ inch in size. This primary structural weld 14 may be deposited by various metal fusion welding techniques. For example, the weld may be applied by gas metal electric arc welding (GMAW) using a welding energy input of approximately 40 kilojoules per inch (KJ/In).

In the invention, a second or reprocessing weld 16 may be deposited along a predetermined length of the primary structural weld 14 and over the toe portion thereof, as at line 17. In this form, the single pass reprocessing weld 16 here is deposited at approximately the mid-portion of the length of the primary structural weld 14 such that, in the example given, the reprocessing weld 16 would have a length of 3½ inches. The reprocessing weld 16 is deposited on the toe portion 17 of the primary structural (fillet) weld 14 at a time when weld 14 has reached ambient (e.g. 70° F.) room temperature, and may be applied by a fusion welding technique such as by GTAW welding using a welding energy input of approximately 21 KJ/In.

In one form, the work angle of the electrodes in reference to the weld surfaces of pieces 11 and 12 when making the welds 14 and 16 is 45°. The filler metal for each such weld preferably may be a low carbon steel wire of 0.045" diameter, specification AWS A5.18-79, E70-S6. The wire normally is added continuously when welding automatically, and incrementally when welding manually. A particular fatigue-prone area of the weldment of FIG. 1 before adding the reprocessing weld 16 has been observed to be about the mid-length portion of the toe 17 of the primary structural (fillet) weld 14. The preferred cross-sectional area of the reprocessing weld bead 16 in FIG. 1 is about ¼ to ⅓ that of the corresponding cross-sectional are of the primary structural (fillet) weld 14. However, use of even a lower ratio of these cross-sectional areas, e.g. one as low as 1/6, can impart significant fatigue resistance to a bracket like bracket 1 of FIG. 1.

The instant reprocessing weld 16 is shown as a single pass continuous stringer bead, although it also could be a bead that is interrupted to form a series of shorter deposits, if necessary or desirable. A single continuous pass is preferred, however, because such interruptions can detract from the strength of the reprocessing weld.

Accelerated fatigue testing of a fillet-welded bracket like that of FIG. 1 except that it has no reprocessing weld and has only a primary structural fillet weld may show fatigue cracking at as little as several thousand cycles. However, when such fillet weld is modified with a reprocessing weld in accordance with invention principles, the fatigue life of the weldment may be extended substantially, e.g. to at least about 35,000-40,000 cycles and on up to as much as 200,000 cycles or more. The weldments with the reprocessing weld applied to the room-temperature primary structural weld provide the preferred results.

Figure 3:
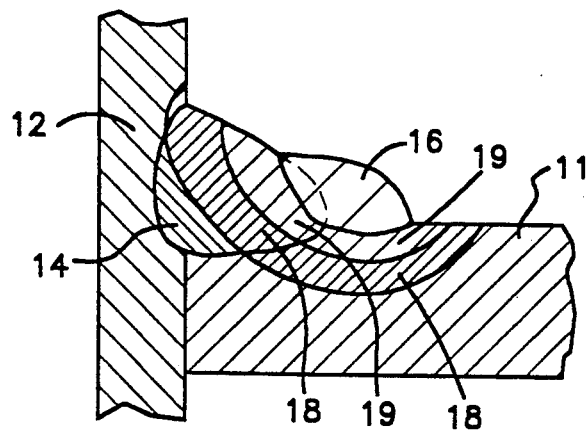
FIG. 3 is a cross-section like that of FIG. 2, except that it is enlarged and on it are depicted the metallurgical zones associated with the resulting welded joint.

FIG. 3 shows generally how, in the weldment of FIG. 1, the tempering zone 18 of the reprocessing weld can penetrate the structural weld 14 and extend to the left and right. This FIG. 3 also shows how the heat-affected zone 19 of the reprocessing weld can penetrate the forward part of the fillet weld 14 and extend into steel piece 11. The reprocessing weld 16 itself penetrates into both the primary structural weld 14 and the steel piece 11.

The result of the heat processing of the primary structural weld 14 with the reprocessing weld 16 alters the microstructure of the primary structural weld and the other metal thereabout beneficially for stress relief and tempering of the joint. The reprocessing weld can act also to melt away any notch formed by a possible weld undercut from the primary structural weld and the reprocessing weld tends to remove detrimental slag and non-metallic inclusions that may be entrapped at the toe of the fillet weld.

Additionally, and very importantly, because the reprocessing weld 16 is deposited at the substantially lower welding energy than is the primary structural weld 14, the reprocessing weld 16 is easier to control as to uniformity, kind and smoothness of contour. Also, there can be provided an improved consistency of structure than if the reprocessing weld had been applied at essentially the same or greater welding energy input as the primary structural weld. Furthermore, the distortion of the welded structure from the reprocessing weld applied in accordance with the invention principles here is negligible, whereas the use of a conventional welding energy input for the reprocessing could result in undesirable distortion. The foregoing and the fact that the reprocessing weld 16 has a significant thickness and adds strengthening metal to achieve practical fatigue resistance, are significant attributes of the reprocessing weld 16.

Figure 4:
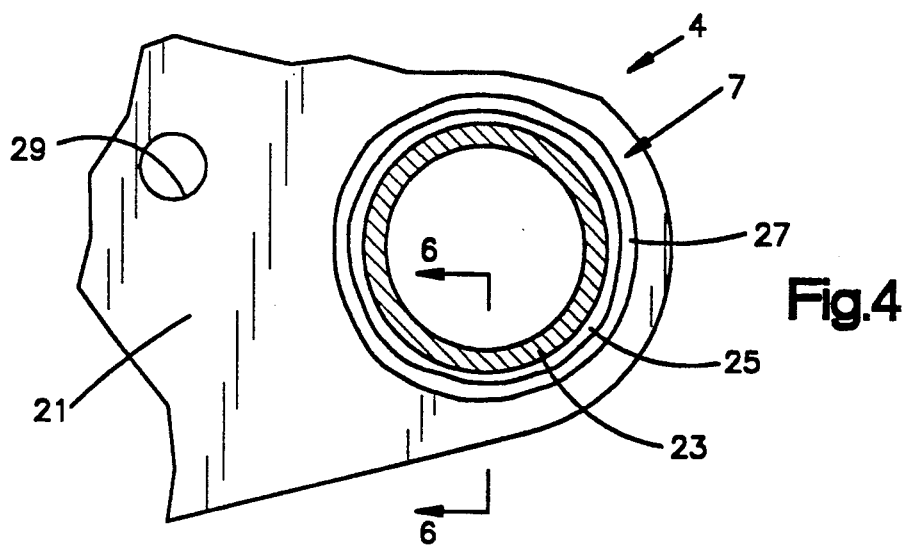
FIG. 4 is a fragmentary top plan view of an air chamber bracket for an automotive truck.
Figure 5:
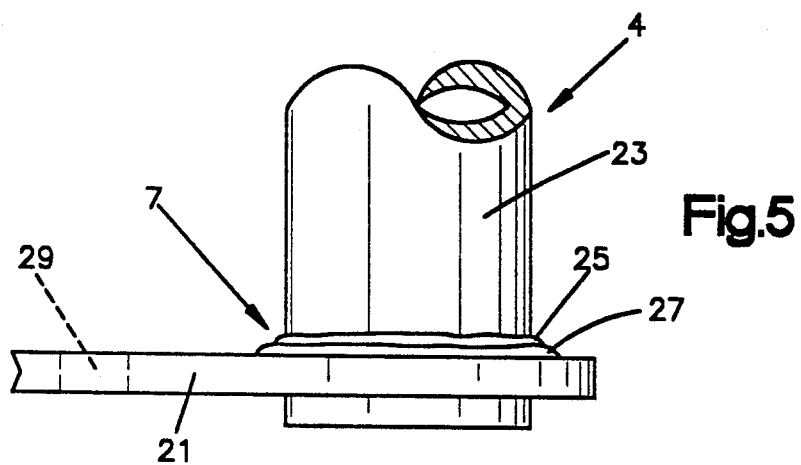
FIG. 5 is a vertical elevation view of the bracket of FIG. 4.
Figure 6:
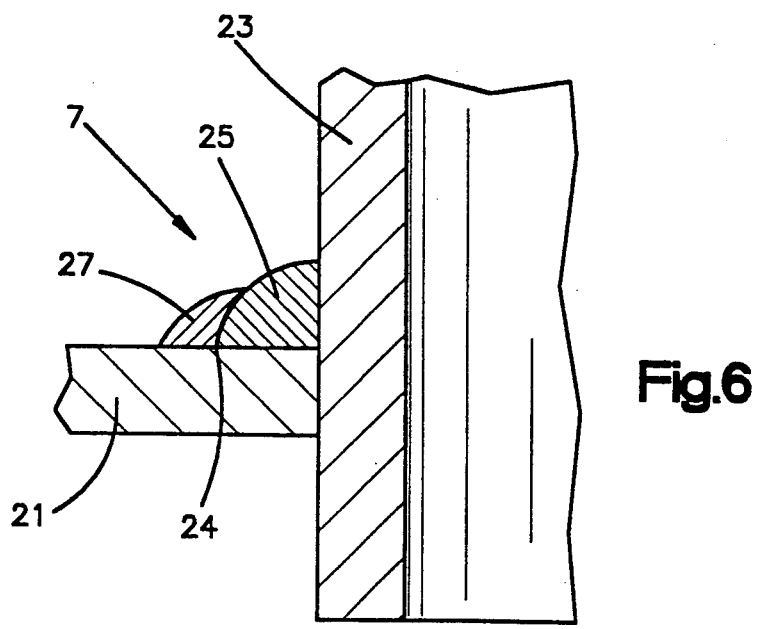
FIG. 6 is a vertical cross-sectional elevation taken through the plane of line 6—6 of FIG. 4.

Referring now to FIGS. 4, 5 and 6, the air chamber bracket is indicated generally by arrow 4. In service an air chamber is bolted to steel arm 21 (7/16 inch thick) and cantilevered out therefrom as a load that vibrates. Arm 21, a tube is fillet-welded by bead 25 about 7.4 inches in outside circumference to arm 21. Overlaying the toe 24 of bead 25 is reprocessing weld 27. The welding energy input for the fillet weld 25 is about 40 KJ/In (E1). The welding energy input for the reprocessing weld 27 is 21 KJ/In ($E_2$). No significant distortion is imparted to the bracket 4 as a result of the reprocessing weld's having been applied to and becoming a part of the bracket structure. The whole reprocessed weld is indicated generally by arrow 7 in these figures.

An air chamber (not shown) for an automotive truck/trailer brake (which the bracket 4 is designed to carry) may be bolted to the arm 11 to provide an actual cantilevered loading on the fillet-welded joint made with bead 25 and reprocessed with weld 27. The bracket 4 then may be subjected to an accelerated fatigue test at its resonant vibrational frequency. The resulting welded joint is deemed to have failed when a 1-inch long crack in a weld or along a weld toe can be seen to open and close (a "breathing crack") as viewed with the naked eye under stroboscopic illumination. Failure by such fatigue cracking of the weld may occur at about 40,000–50,000 cycles or substantially later, e.g. as much as 200,000 cycles. The result here is considered to be satisfactory for the particular truck part. Without the reprocessing weld 27, the fatigue life of such bracket (ended by the development of a 1-inch long breathing crack described above) may be as low as 3,000–20,000 cycles of vibration.

The various useful welding processes are fusion welding processes, and they include: gas tungsten arc welding (GTAW) a preferred choice for the reprocessing weld); gas metal arc welding (GMAW, a second choice for the reprocessing weld); plasma arc welding (PAW); shielded metal arc welding (SMAW); plasma transferred arc welding; and submerged arc welding. Other suitable welding processes include laser beam welding and electron beam welding. The preferred welding techniques lend themselves to especially good control of the energy input to, the weld size of, and the weld contour of the reprocessing weld. Oxyfuel welds could be used, but generally are thought too slow to be truly practical. Wire is the preferred useful filler metal feed form although plasma and plasma transferred arc welding techniques can employ a powdered filler metal. Both the reprocessing weld and the primary structural weld can be made automatically or manually as desired.

The principle weldable metals for making the inventive weldments are ferrous metals, e.g. mild steel and stainless steels. Other weldable metals may include nickel, cobalt, aluminum, titanium, magnesium, copper, and some bronzes.

The instant reprocessing weld is formed by a single pass rather than by multiple passes. The welding energy input $E_2$ used for depositing the reprocessing weld bead will be less than the welding energy input $E_1$ that is used for depositing the primary structural weld, the toe of which structural weld it overlays in accordance with this invention. In general, such $E_2$ may be about 30–90% of its corresponding $E_1$. The greatest improvements in increasing fatigue resistance have come when the $E_2$ is about 45–85% of the corresponding $E_1$.

The welding energy input for an electric arc welding pass can be calculated from electrical and time measurements made during the welding. The usual current is d.c., but alternating current welding practice also can be adopted. Ordinarily, the reprocessing weld beads are of reasonably constant width, and are made with a straight linear application. However, an oscillatory application can be used. The cross-sectional area of the reprocessing weld corresponding to that of its primary structural weld is measured through a plane normal to the toe of the primary structural weld being covered by said reprocessing weld as seen in FIG. 2. The mean average of several such measurements taken along the length of the covered toe is the most accurate. When reference is made to the reprocessing weld having the smaller cross-sectional area of these two welds, what is meant is the average cross-sections of each such weld.

The cross-sectional area of a single pass reprocessing weld generally will be about 1/6 to 2/3 that of a primary structural weld, most often about ¼ to ½. Only occasionally will such ratio be much above about ½, and then mostly in the reprocessing of somewhat heavier (larger leg length) welds than the preferred ones described above. The thickness of the reprocessing weld will be correspondingly smaller than that of the primary structural weld, e.g. typically about ⅓ to 8/10 that of the latter. While the reprocessing weld length can run the full length of the primary structural weld toe, it usually is quite effective, adequate, and more efficient and economical for the instant fatigue-resisting purposes, if the reprocessing weld is less than the full length thereof. For example, the reprocessing weld may be about ¼ to ⅝ such length.

Unless expressly stated otherwise herein, the welding terms used herein are those defined by the American Welding Society in its 1985 publication ANSI/AWS-A3.0-85 entitled "Standard Welding Terms and Definitions."

Many other modifications and variations of the invention will be apparent to those skilled in the art in the light of the foregoing disclosure and drawings. Therefore, it is to be understood that, within the scope of the appended claims, the invention can be practiced otherwise than has been specifically shown and described.

We claim:

1. A process for improving the fatigue resistance of a small primary structural weld at a joint between structural members of a weldment, the weld having been made with the welding energy input of $E_1$, the process comprising:

applying a reprocessing weld on at least a portion of either one or both toes of the primary structural weld, thereby covering said toe portion, the reprocessing weld containing a filler metal and having a cross-sectional area which is less than the corresponding cross-sectional area of the primary structural weld, the reprocessing weld extending onto the face of the primary structural weld at one side of the toe portion covered and onto the structural member at the other side of the toe portion covered, and the total welding energy input, $E_2$, used in said reprocessing the primary structural weld being less than the welding energy input $E_1$ of the primary structural weld.

2. The process in accordance with claim 1 wherein the primary structural weld is a fillet weld, both the fillet weld and the reprocessing weld being made by an electric arc process, the structural members being of ferrous metals, and the reprocessing weld is a single pass weld.

3. The process in accordance with claim 2 wherein the reprocessing weld is made when the fillet weld is at about the ambient temperature, and the structural members are steel members.

4. The process in accordance with claim 2 wherein the reprocessing weld is made while the fillet weld is above the ambient temperature, and the structural members are steel members.

5. The method according to claim 1 wherein the reprocessing weld is deposited with a weld energy of from about 45 to about 85% of $E_1$.

6. The method according to claim 1 wherein the reprocessing weld is from about ¼ to about ⅝ the size of the primary structural weld.

7. The method according to claim 1 wherein the reprocessing weld does not extend the full length of the primary structural weld.

8. A process for making a fatigue-resistant welded joint at the angular junction of two steel members which comprises:

first applying by electric arc welding a small fillet weld on the junction, said joint being free from prior welds, the welding energy used being $E_1$, applying by electric arc welding a single pass reprocessing weld on at least a portion of one or both toes of the fillet weld, thereby covering said toe portion, the reprocessing weld containing a filler metal and having a cross-sectional area which is less than the corresponding cross-sectional area of the fillet weld, the reprocessing weld extending onto the face of the fillet weld at one side of the toe portion covered and onto the steel member on the other side of the toe portion covered, and the total welding energy input $E_2$ of the reprocessing weld being less than the welding energy input $E_1$ of the fillet weld.

9. The process of claim 8 wherein the root of the fillet weld is longer than that of the reprocessing weld, $E_2$ is not substantially more than about 85% of $E_1$, and the reprocessing weld is applied by gas tungsten arc welding.

10. The method according to claim 8 wherein the reprocessing weld is deposited with a weld energy of from about 45 to about 85% of $E_1$.

11. The method according to claim 8 wherein the reprocessing weld is from about ¼ to about ⅔ the size of the primary structural weld.

12. The method according to claim 8 wherein the reprocessing weld does not extend the full length of the primary structural weld.

13. A small, fatigue-resistant welded joint consisting essentially of:

a pair of structural members jointed together by a primary structural weld, said primary structural weld having been deposited with the welding energy input of $E_1$, and a reprocessing weld on at least a portion of one or both toes of the primary structural weld, thereby covering said toe portion, the reprocessing weld extending onto the face of the primary structural weld at one side of the toe portion covered and onto the structural member at the other side of the toe portion covered, the reprocessing weld containing a filler metal and having a cross-sectional area which is less than the corresponding cross-sectional area of the primary structural weld, and the reprocessing weld having been deposited with the welding energy input of $E_2$, $E_2$ being less than $E_1$.

14. The joint of claim 13 wherein the primary structural weld is a fillet weld, the reprocessing weld is a single pass weld, the structural members are ferrous, the root of the reprocessing weld is at least ⅓ as long as that of the fillet weld, and both said welds are electric arc welds.

15. The joint of claim 13 wherein the structural members comprise steel, the root of the fillet weld is at least about 3 inches long, and the welds are gas tungsten arc welds.

16. The welding joint according to claim 13 wherein the reprocessing weld is deposited with a weld energy of from about 45 to about 85% of $E_1$.

17. The welding joint according to claim 13 wherein the reprocessing weld is from about ¼ to about ⅔ the size of the primary structural weld.

18. The welding joint according to claim 13 wherein the reprocessing weld does not extend the full length of the primary structural weld.

19. A steel bracket for automotive use comprising the fatigue-resistant fillet-welded joint consisting essentially of:

a pair of structural members jointed together by a primary structural weld, said primary structural weld having been deposited with the welding energy input of $E_1$, and a reprocessing weld on at least a portion of one or both toes of the primary structural weld, thereby covering said toe portions, the reprocessing weld extending onto the face of the primary structural weld at one side of the toe portion covered and onto the structural member at the other side of the toe portion covered, the reprocessing weld containing a filler metal and having a cross-sectional area which is less than the corresponding cross-sectional area of the primary structural weld, and the reprocessing weld having been deposited with the welding energy input of $E_2$, $E_2$ being less than $E_1$.

20. The bracket according to claim 19 wherein the reprocessing weld is deposited with a weld energy of from about 45 to about 85% of $E_1$.

21. The bracket according to claim 19 wherein the reprocessing weld is from about ¼ to about ⅔ the size of the primary structural weld.

* * * * *